(No Model.)
J. A. MORRELL.
EVAPORATOR.
No. 281,912. Patented July 24, 1883.
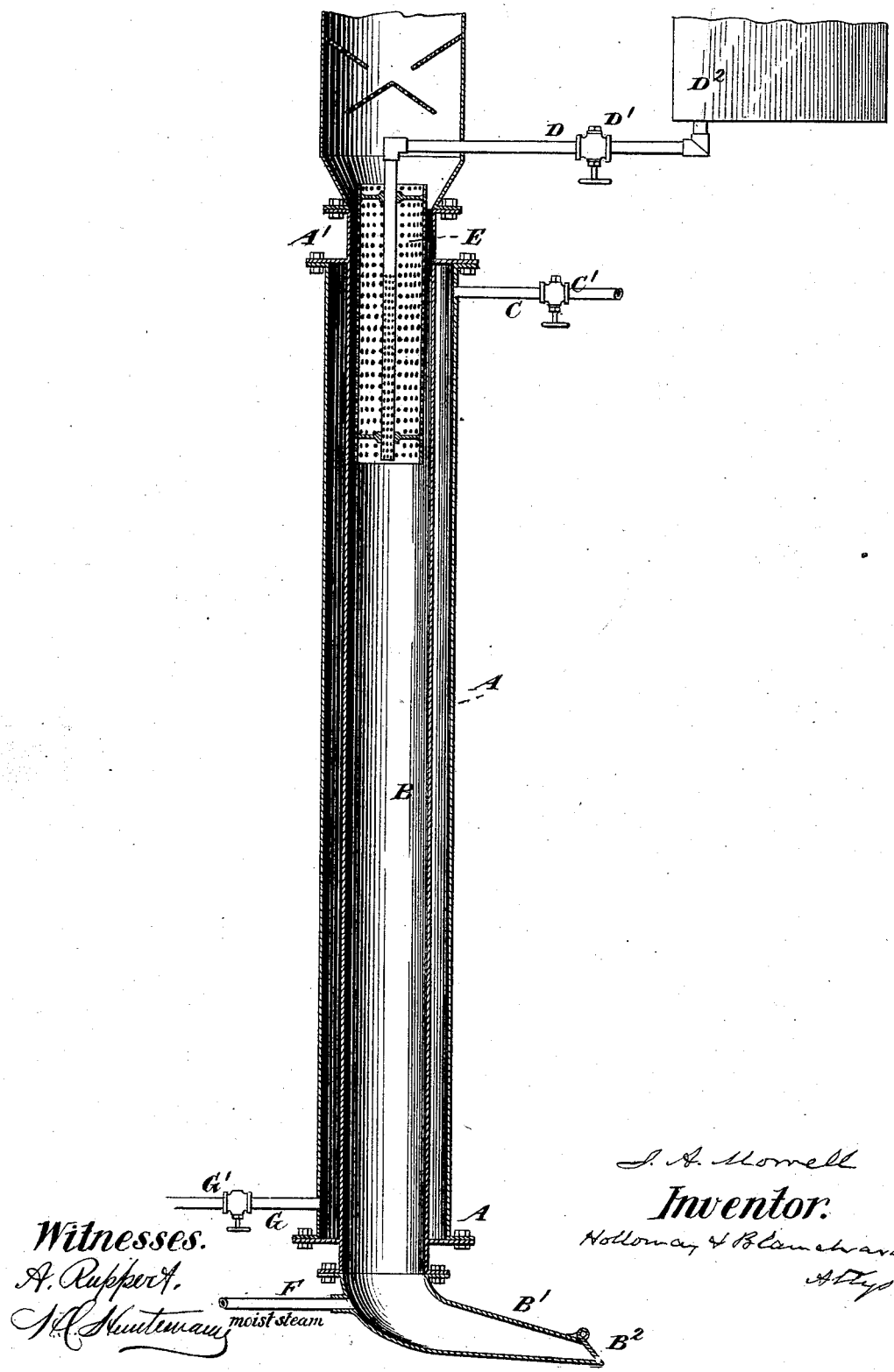

UNITED STATES PATENT OFFICE.

JAMES A. MORRELL, OF NEW YORK, N. Y., ASSIGNOR TO RANSOM RATHBONE.

EVAPORATOR.

SPECIFICATION forming part of Letters Patent No. 281,912, dated July 24, 1883.

Application filed November 23, 1882. (No model.)

*To all whom it may concern:*

Be it known that I, JAMES A. MORRELL, a citizen of the United States, residing at New York, in the county of New York and State of New York, have invented certain new and useful Improvements in Evaporators; and I do declare the following to be a full, clear, and exact description of the invention, such as will enable others skilled in the art to which it appertains to make and use the same, reference being had to the accompanying drawing, and to the letters and figures of reference marked thereon, which form a part of this specification.

My invention relates to an apparatus for evaporating cane-juice and other liquid substances containing saccharine matters, and for converting said saccharine matter into sugar. It may also be used to advantage for the evaporation of salt-water and various other substances containing matter which it is desirable to convert into solids, as well as for condensing milk, it consisting in the combination of certain elements to be hereinafter named, the object of which is to prevent the substances being treated from coming in contact with the heated walls of the pipe or vessel in which the evaporation takes place. I attain these objects by the devices illustrated in the accompanying drawing, in which there is shown a pipe or vessel, A, which may be of any desired length and diameter that will adapt it to the work to be done. This pipe is supplied at both of its ends with closely-fitting heads, which are secured thereto by bolts or screws A' A', they being provided with apertures at their centers for the reception of a pipe or vessel, B, which extends through said heads for some distance at both of its ends. The lower end of said vessel B is provided with a nozzle, B', the outlet end of which has placed upon it a valve, B², which is designed to regulate the flow of material from the pipe or vessel after it has been deprived of a portion or all of its water, such evaporation being caused by the admission of steam or highly-heated air into the chamber or space between the pipes or vessels A and B, through a pipe, C, the amount admitted being controlled by a valve, C', as shown. To the upper end of pipe or vessel B there is secured an open-ended funnel for the escape of the steam arising from the water contained in the material under treatment, said material being admitted by means of a pipe, D', which conducts it thereto from any suitable reservoir, D², or it may be from a pump, the amount thus admitted being regulated by a valve, D'. The pipe D enters the funnel through which the steam escapes, and is turned downward, its lower portion being perforated, as shown in the drawing, and has its lower end closed in order that as the material enters it may be thrown outward in a spray or in small jets, and thus brought into contact with a protector, E, which may be made of fine wire-gauze, or of finely-perforated sheet metal, and coated with tin or some other non-corrosive material. The office of the protector E is to prevent the saccharine matter from coming in contact with the heated walls of the vessel B as it enters, as, if it is allowed to do so, it will be to some extent caramelized, and thus have its quality injured, if it is not rendered worthless thereby.

In operating this apparatus superheated steam or saturated steam at a high temperature, or it may be heated air, is admitted to the chamber through the pipe C, and consequently the material on entering is subjected to a high degree of heat, but is prevented from being injured by the protector, through the lower open end of which it falls, it being further heated and evaporated by coming in contact with a body of ascending steam, which is admitted through a pipe, F, which enters nozzle B'. The water of condensation is drawn off from the chamber between the pipes A and B through a pipe, G, the opening in which is controlled by a valve or cock, G'.

Having thus described my invention, what I claim, and desire to secure by Letters Patent, is—

The combination, in an apparatus for evaporating saccharine and other liquids which it is desirable to convert into solids, of a pipe or vessel through which the material passes while undergoing evaporation, and a protector arranged in connection therewith, substantially as hereinbefore set forth, for the purpose of preventing the substance being treated from coming in contact with the walls of the evaporator, and thus being injured.

In testimony whereof I affix my signature in presence of two witnesses.

JAMES A. MORRELL.

Witnesses:
WM. H. GARDNER,
ROBERT DOOLAN.